(12) United States Patent
An et al.

(10) Patent No.: US 11,126,024 B2
(45) Date of Patent: Sep. 21, 2021

(54) DISPLAY APPARATUS FOR VEHICLE

(71) Applicants: Hyundai Motor Company, Seoul (KR); Kia Motors Corporation, Seoul (KR)

(72) Inventors: Jongkyo An, Osan-Si (KR); Yang Ho Ryu, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/664,598

(22) Filed: Oct. 25, 2019

(65) Prior Publication Data
US 2020/0257158 A1 Aug. 13, 2020

(30) Foreign Application Priority Data
Feb. 12, 2019 (KR) .......................... 10-2019-0015968

(51) Int. Cl.
*G02F 1/1333* (2006.01)

(52) U.S. Cl.
CPC .. *G02F 1/133308* (2013.01); *G02F 1/133317* (2021.01); *G02F 2202/28* (2013.01)

(58) Field of Classification Search
CPC ................................................ G02F 1/133308
See application file for complete search history.

(56) References Cited

U.S. PATENT DOCUMENTS

| | | | | |
|---|---|---|---|---|
| 6,559,907 | B1* | 5/2003 | Byoun | G02F 1/133308 349/58 |
| 9,568,800 | B1* | 2/2017 | Sprague | G02F 1/133308 |
| 2010/0253874 | A1* | 10/2010 | Ito | G02F 1/133308 349/58 |
| 2011/0299006 | A1* | 12/2011 | Cheng | G02B 6/0086 349/58 |
| 2012/0242926 | A1* | 9/2012 | Hsu | G02F 1/133308 349/58 |
| 2013/0321293 | A1* | 12/2013 | Park | G02B 6/0088 345/173 |
| 2014/0218656 | A1* | 8/2014 | Maruno | G02F 1/133608 349/60 |
| 2015/0160401 | A1* | 6/2015 | Namekata | G02B 6/005 349/65 |

(Continued)

FOREIGN PATENT DOCUMENTS

KR 10-2013-0030365 A 3/2013

*Primary Examiner* — Sang V Nguyen
(74) *Attorney, Agent, or Firm* — Morgan, Lewis & Bockius LLP

(57) ABSTRACT

A display apparatus of a vehicle may include a display panel; a cover glass covering a front surface of the display panel; a backlight unit mounted behind the display panel and having a width smaller than a width of the display panel; and a housing including a frame portion covering peripheral edge portions of the backlight unit, the display panel, and the cover glass, and a rear surface portion integrally provided with the frame portion and covering a rear surface of the backlight unit; wherein the frame portion includes a stepped portion protruding step-shaped from an internal surface of the frame portion to support a rear surface of the display panel and to cover a peripheral edge portion of the backlight unit.

3 Claims, 5 Drawing Sheets

(56) References Cited

U.S. PATENT DOCUMENTS

| | | | |
|---|---|---|---|
| 2015/0168767 A1* | 6/2015 | Yonemura | G02F 1/133308 349/58 |
| 2015/0296634 A1* | 10/2015 | Itoh | G02F 1/133308 361/679.01 |
| 2016/0178957 A1* | 6/2016 | Nakanishi | G02F 1/133308 349/58 |
| 2017/0192291 A1* | 7/2017 | Shi | G02F 1/13338 |
| 2018/0307101 A1* | 10/2018 | Ryu | G02B 6/0038 |
| 2018/0317000 A1* | 11/2018 | Ham | H04R 9/06 |
| 2018/0356681 A1* | 12/2018 | Wang | G02F 1/133528 |
| 2019/0384090 A1* | 12/2019 | Kishimoto | G09F 21/04 |

\* cited by examiner

DISPLAY APPARATUS FOR VEHICLE

CROSS-REFERENCE TO RELATED APPLICATION(S)

The present application claims priority to Korean Patent Application No. 10-2019-0015968, filed on Feb. 12, 2019, the entire contents of which is incorporated herein for all purposes by this reference.

BACKGROUND OF THE INVENTION

Field of the Invention

The present invention relates to a display apparatus for a vehicle having a thin thickness and a small bezel size.

Description of Related Art

Generally, a vehicle has a display apparatus configured for providing a variety of information to an occupant. The display apparatus can selectively display navigation, driving information, a status of various devices such as air conditioner, audio, video, etc., broadcasting, and stored images or films, and the like. Furthermore, the display apparatus may be used as a touch input type interface for controlling various devices of the vehicle.

The display apparatus may include a display panel for displaying images and/or films, a cover glass covering a front of the display panel, a backlight unit mounted behind the display panel, a front cover, a rear cover, a plurality of reinforcement members provided in the rear cover for reinforcing rigidity, and adhesive members and fastening members for assembling components.

As the display apparatus is mounted in a vehicle, it is necessary to protect the display panel or the cover glass from vibration or shock. Therefore, the display apparatus of a vehicle increases the size and thickness of the front and rear covers, and enhances rigidity by providing a plurality of reinforcement members therein.

However, such a conventional display apparatus has problems with increasing of thickness and bezel size, and weight due to the front cover, the rear cover, and the plurality of reinforcement members mounted therein.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a display apparatus of a vehicle configured for maintaining sufficient rigidity while reducing thickness and bezel size.

Various aspects of the present invention are directed to providing a display apparatus of a vehicle configured for stably protecting internal components from shock and vibration.

Additional aspects of the present invention will be set forth in part in the description which follows and, in part, will be obvious from the description, or may be learned by practice of the present invention.

In accordance with one aspect of the present invention, a display apparatus of a vehicle includes a display panel; a cover glass covering a front surface of the display panel; a backlight unit mounted behind the display panel and having a width smaller than a width of the display panel; and a housing including a frame portion covering peripheral edge portions of the backlight unit, the display panel, and the cover glass, and a rear surface portion integrally provided with the frame portion and covering a rear surface of the backlight unit; wherein the frame portion includes a stepped portion protruding step-shaped from an internal surface of the frame portion to support a rear surface of the display panel and to cover a peripheral edge portion of the backlight unit.

Furthermore, the display apparatus may further include an adhesive member bufferably attaching the rear surface of the display panel to a front surface of the stepped portion.

Furthermore, the cover glass may be attached to the front surface of the display panel by an adhesive or an adhesive sheet.

Furthermore, a width of the cover glass may be greater than the width of the display panel, and a peripheral edge portion of the cover glass may be spaced from the internal surface of the frame portion.

Furthermore, a width of the cover glass may be the same as the width of the display panel, and each peripheral edge portion of the cover glass and the display panel may be spaced from the internal surface of the frame portion.

Furthermore, a front surface of the frame portion may protrude more forward than a front surface of the cover glass to form a step therebetween.

Furthermore, a front surface of the backlight unit may be spaced from the rear surface of the display panel, and the peripheral edge portion thereof may be spaced from the stepped portion.

Furthermore, the housing may include a first curved surface portion connecting a front surface of the frame portion to an external peripheral surface of the frame portion, and a second curved surface portion connecting the external peripheral surface of the frame portion to the rear surface portion.

Furthermore, the display apparatus may further include a first adhesive member bufferably attaching the rear surface of the display panel to a front surface of the stepped portion and maintaining a gap between the rear surface of the display panel and a front surface of the backlight unit; and a second adhesive member bufferably attaching a rear surface of a peripheral rim of the cover glass to a front surface of a peripheral rim of the display panel and maintaining a gap between a rear surface of the cover glass and the front surface of the display panel.

In accordance with another aspect of the present invention, a display apparatus of a vehicle includes a display panel; a cover glass covering a front surface of the display panel and having a width greater than a width of the display panel; a backlight unit mounted behind the display panel and having a width smaller than the width of the display panel; and a housing including a frame portion covering peripheral edge portions of the backlight unit, the display panel, and the cover glass, and a rear surface portion integrally provided with the frame portion and covering a rear surface of the backlight unit; wherein the frame portion includes a stepped portion protruding step-shaped from an internal surface of the frame portion to support a rear surface of the cover glass and to cover peripheral edge portions of the display panel and the backlight unit.

Furthermore, the display apparatus may further include a panel supporting member mounted on an internal surface of the stepped portion for supporting a rear surface of a peripheral rim of the display panel, a first adhesive member bufferably attaching the rear surface of the peripheral rim of the display panel to a front surface of the panel supporting member, and a second adhesive member bufferably attaching a rear surface of a peripheral rim of the cover glass to a front surface of the stepped portion.

Furthermore, the front surface of the display panel may be spaced from the rear surface of the cover glass, and the peripheral edge portion thereof may be spaced from the stepped portion.

Furthermore, a front surface of the backlight unit may be spaced from a rear surface of the display panel, and the peripheral edge portion thereof may be spaced from the stepped portion.

Furthermore, the peripheral edge portion of the cover glass may be spaced from the internal surface of the frame portion, and a front surface of the frame portion may protrude more forward than a front surface of the cover glass to form a step therebetween.

Furthermore, the housing may further include a rear cover covering the rear surface portion and a portion of an external peripheral surface of the frame portion.

Furthermore, the external peripheral surface of the frame portion may include a rear cover engaging portion having a step corresponding to the thickness of the rear cover.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
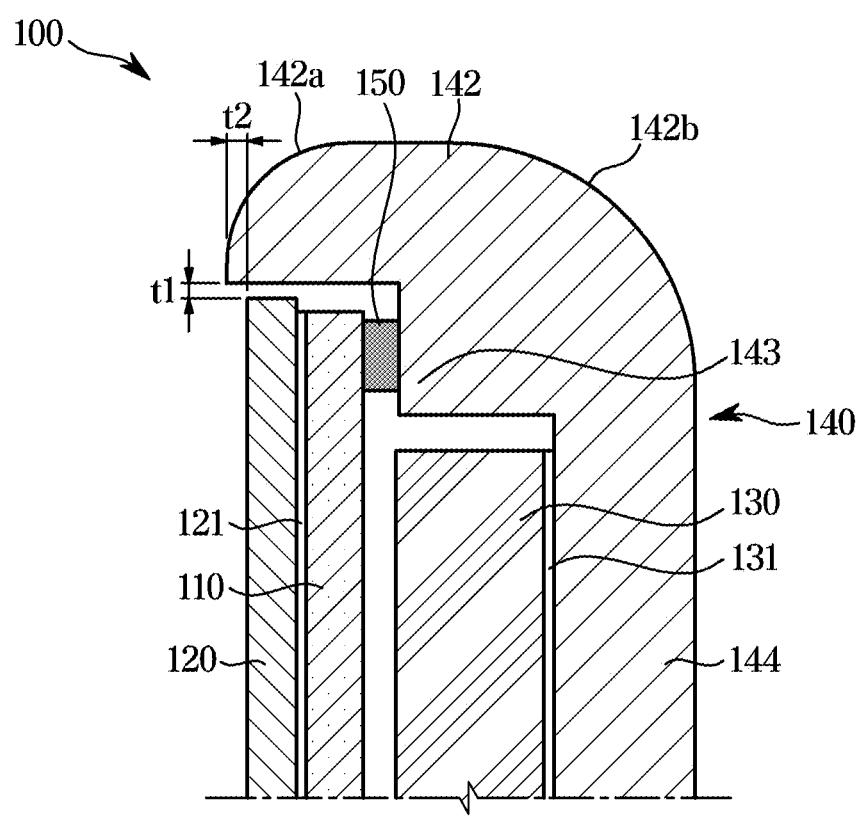
FIG. 1 is a cross-sectional view of a display apparatus of a vehicle, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings. The following embodiments are provided to sufficiently transfer the technical concepts of the present invention to one of ordinary skill in the art. However, the present invention is not limited to these embodiments, and may be embodied in another form. In the drawings, portions that are irrelevant to the descriptions may not be shown to clarify the present invention, and also, for easy understanding, the widths, lengths, thicknesses, etc. of components are more or less exaggeratedly shown. Like numbers refer to like elements throughout the present specification.

Figure 2:
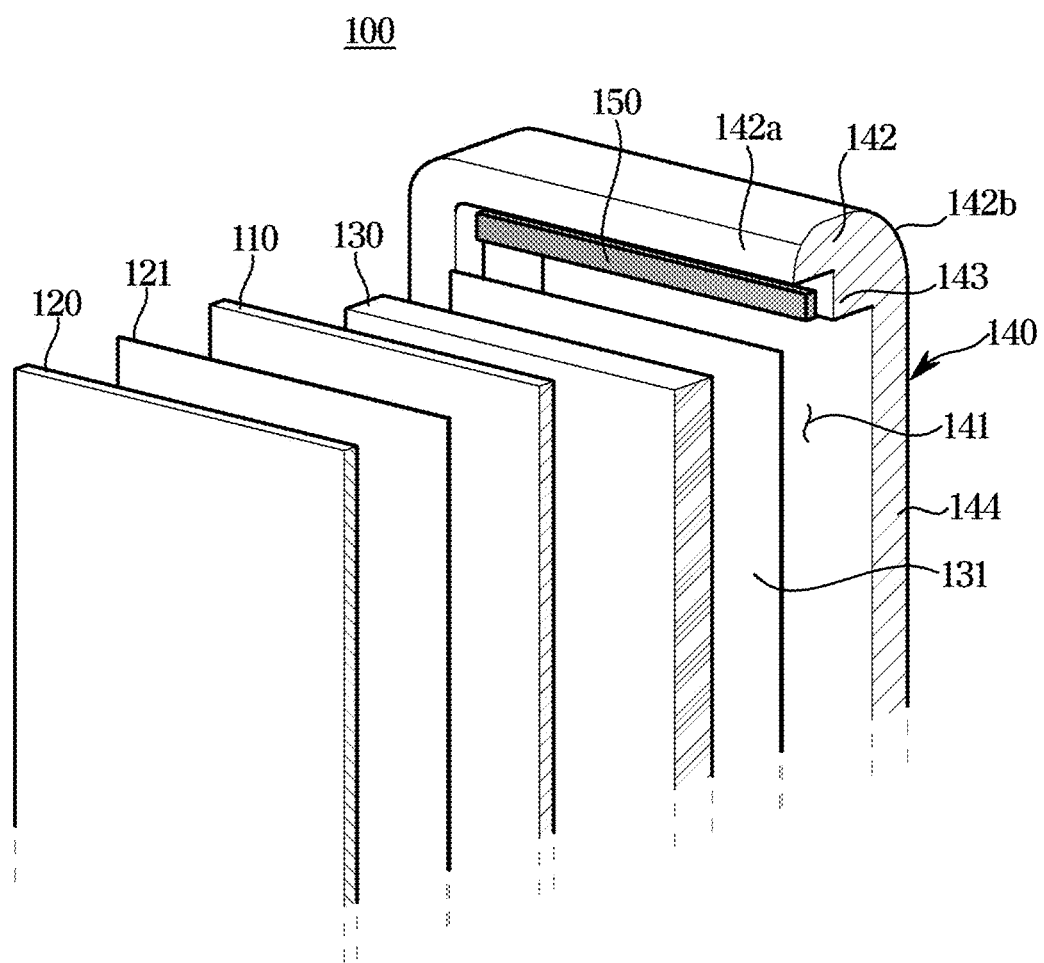
FIG. 2 is an exploded perspective view of the display apparatus of a vehicle, according to the various exemplary embodiments of the present invention.

Referring to FIG. 1 and FIG. 2, a display apparatus 100 for a vehicle according to various exemplary embodiments includes a display panel 110, a cover glass 120, a backlight unit 130, and a housing 140.

The display panel 110 may include a liquid crystal display (LCD), a thin film transistor-liquid crystal display (TFT LCD), a flexible display, a 3-dimensional display, and an e-ink display, and the like. The display panel 110 may include a touch sensor for detecting touch input of a user.

The cover glass 120 covers a front surface of the display panel 110 to protect the display panel 110. The cover glass 120 may also include a touch sensor for detecting the user's touch input.

The backlight unit 130 supplies light from a rear side of the display panel 120 to the display panel 110. The backlight unit 130 may configure to a cold cathode fluorescent lamp (CCFL), an external electrode fluorescent lamp (EEFL), and a light emitting diode (LED).

Each of the cover glass 120, the display panel 110, and the backlight unit 130 are provided in a form of a flat plate and are sequentially mounted in a front-rear direction thereof.

The housing 140 has an accommodation space 141 that accommodates the cover glass 120, the display panel 110, and the backlight unit 130 and which is open at a front. The housing 140 includes a frame portion 142 covering a peripheral portion of the backlight unit 130, the display panel 110, and the cover glass 120, and a rear surface portion 144 integrally formed with the frame portion 142 and covering a rear surface of the backlight unit 130. The housing 140 may be made of a non-ferrous metal material that maintains a sufficient rigidity to protect internal components and has excellent heat radiation effect.

The backlight unit 130 is provided such that a width thereof in a vertical and horizontal directions is smaller than that of the display panel 110 in the vertical and horizontal directions. The backlight unit 130 is mounted in the innermost portion of the accommodation space 141 of the housing 140. The rear surface of the backlight unit 130 may be attached to a front surface of the rear surface portion 144 of the housing 140 by a double-sided adhesive sheet 131. Herein, the case where the rear surface of the backlight unit 130 is attached to the rear surface portion 144 of the housing 140 by the adhesive sheet 131 is shown, but the rear surface of the backlight unit 130 may be configured to be spaced from the rear surface portion 144.

The frame portion 142 of the housing 140 has a stepped portion 143 protruding step-shaped from an internal surface of the frame portion to support a rear surface of the display panel 110 and to cover a peripheral edge portion of the backlight unit 130 fixed to the rear surface portion 144. As well as functioning to support the display panel 110, the stepped portion 143 is configured to strengthen the rigidity of the housing 140 by increasing the thickness of a portion where the frame portion 142 and the rear surface portion 144 are connected.

A rear surface of a peripheral rim of the display panel 110 is attached to a front surface of the stepped portion 143 by an adhesive member 150. The adhesive member 150 is provided by an elastic material having a predetermined thickness and has adhesive portions on both sides. The adhesive member 150 may attach the rear surface of peripheral rim of the display panel 110 to the front surface of the stepped portion 143 and to bufferably support the display panel 110.

As shown in FIG. 1, the front surface of the backlight unit 130 is spaced from the rear surface of the display panel 110, and the peripheral edge portion thereof is spaced from the stepped portion 143. Accordingly, the backlight unit 130 does not affect the display panel 110 when the backlight unit 130 is deformed such as expanding in high temperature or high humidity environments. Furthermore, the front surface and the peripheral edge portion of the backlight unit 130 are spaced from the display panel 110 and the housing 140. Accordingly, when the housing 140 receives shock or vibration, the front surface and the peripheral edge portion of the backlight unit 130 may be protected from breakage and the shock may be prevented from being transmitted to the display panel 110.

The display panel 110 is bufferably supported by the adhesive member 150 configured for being elastically deformed and a peripheral edge portion thereof is spaced from an internal surface of the frame portion 142 and the rear surface thereof is spaced from the front surface of the backlight unit 130. Accordingly, when the housing 140 or the backlight unit 130 is expanded or contracted by heat or when shock and vibration are applied to the housing 140, the display panel 110 may be stably protected inside the housing 140 without any influence of an external force.

The cover glass 120 may be attached to the front surface of the display panel 110 by an optical adhesive or an optical adhesive sheet 121 to protect the display panel 110. The cover glass 120 may have a width in the vertical and horizontal directions greater than the width of the display panel 110 in the vertical and horizontal directions for protecting the display panel 110. A peripheral edge portion of cover glass 120 is spaced from the internal surface of the frame portion 142 with a predetermined distance t1 to be protected from the shock and vibration of the housing 140.

A front surface of the frame portion 142 of the housing 140 may protrude more forward than a front surface of the cover glass 120 to form a step t2 therebetween. The present structure can stably protect a peripheral portion of the cover glass 120 from external impact.

As shown in FIG. 1, the housing 140 includes a first curved surface portion 142a connecting the front surface of the frame portion 142 to an external peripheral surface of the frame portion 142 and a second curved surface portion 142b connecting the external peripheral surface of the frame portion 142 to the rear surface portion 144. The first and second curved surface portions 142a and 142b are formed by curving an external surface of the housing 140, protecting an occupant.

In the display apparatus 100, the frame portion 142 and the rear surface portion 144 of the housing 140 are integrally formed thereon, and the display panel 110, the backlight unit 130, and the cover glass 120 are accommodated in the housing 140, so that the sufficient rigidity may be maintained while reducing the thickness and the bezel size.

Furthermore, in the display apparatus 100, the rear surface of the display panel 110 is spaced from the front surface of the backlight unit 130, the peripheral edge portions of the display panel 110 and the cover glass 120 are spaced from the housing 140, the peripheral edge portion of the backlight unit 130 is spaced from the housing 140, and the display panel 110 is supported by the bufferable adhesive member 150, so that the internal components may be stably protected when the housing 140 or the backlight unit 130 is expanded or contracted by heat or shock and vibration are applied to the housing 140.

Figure 3:
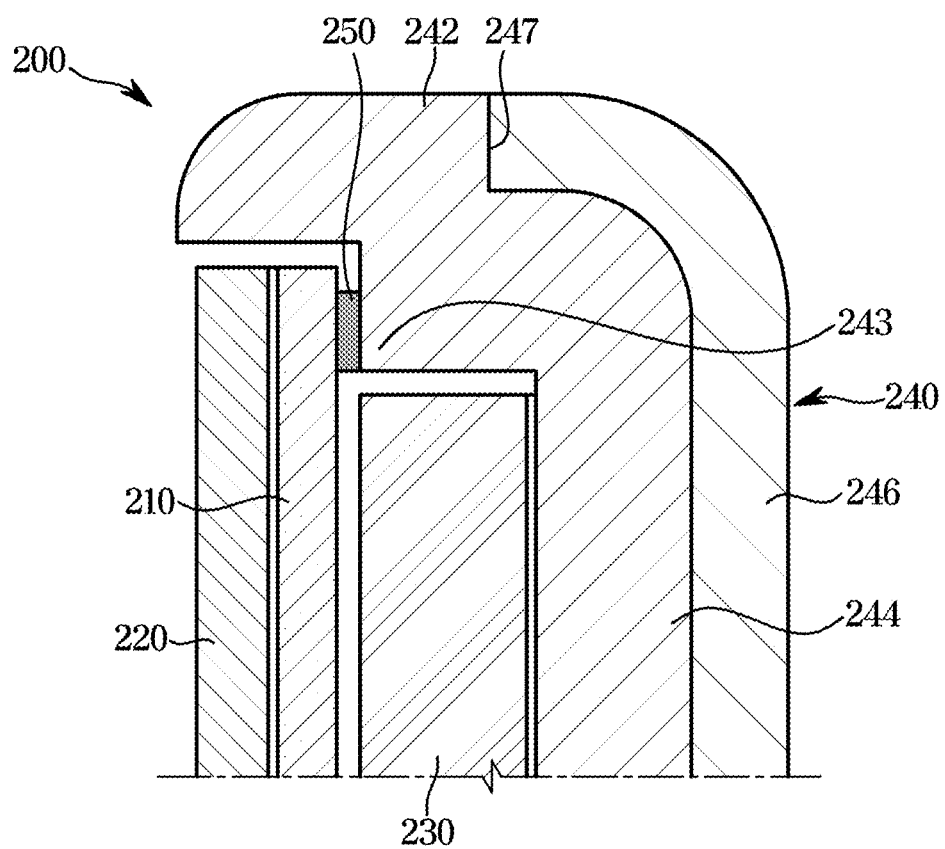
FIG. 3 is a cross-sectional view of a display apparatus of a vehicle, according to various exemplary embodiments of the present invention.

FIG. 3 shows a display apparatus according to various exemplary embodiments. A display apparatus 200 of the various exemplary embodiments includes a display panel 210, a cover glass 220, a backlight unit 230, and a housing 240. In the various exemplary embodiments of the present invention, the cover glass 220 and the display panel 210 have the same width in the vertical and horizontal directions.

In the various exemplary embodiments of the present invention, peripheral edge portions of the cover glass 220 and the display panel 210 are also spaced from an internal surface of a frame portion 242 of the housing 240. A rear surface of a peripheral rim of the display panel 210 is attached to a front surface of a stepped portion 243 of the frame portion 242 by a bufferable adhesive member 250. A peripheral edge portion of the backlight unit 230 is spaced from the stepped portion 243 and a front surface thereof is spaced from a rear surface of the display panel 210.

In the various exemplary embodiments of the present invention, the housing 240 includes a rear cover 246 for covering a rear surface portion 244 and a portion of an external peripheral surface of the frame portion 242. The external peripheral surface of the frame portion 242 may include a rear cover engaging portion 247 having a step corresponding to the thickness of the rear cover 246 to install the rear cover 246. The rear cover 246 may be attached to the external surface of the housing 240 to enhance the rigidity of the housing 240 and improve the degree of freedom in a behind design of the display apparatus 200.

Figure 4:
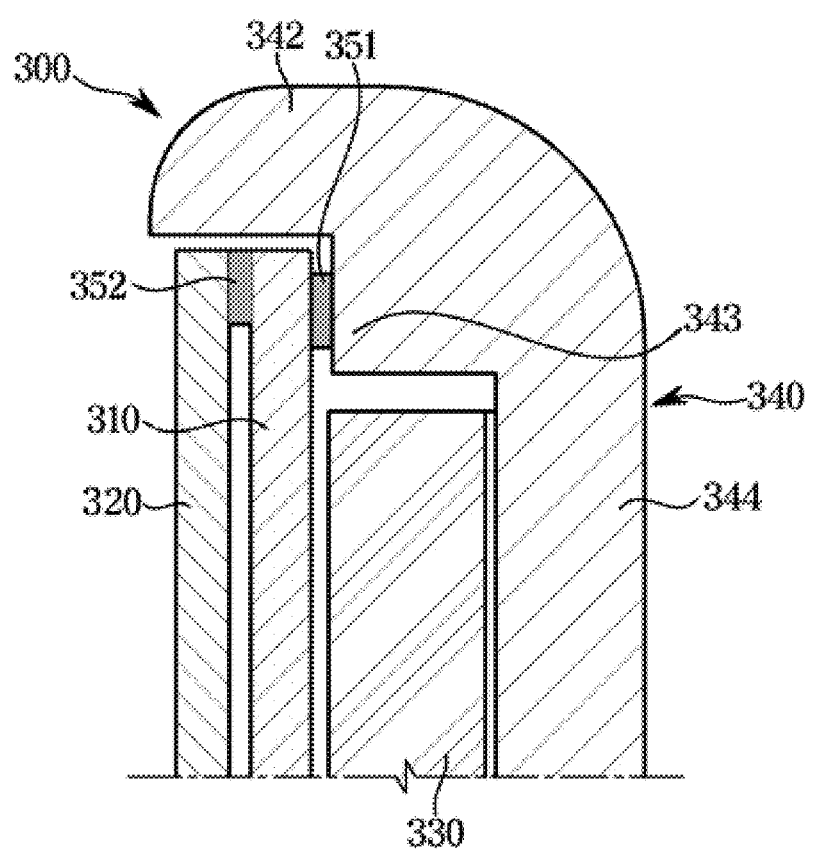
FIG. 4 is a cross-sectional view of a display apparatus of a vehicle according to various exemplary embodiments of the present invention.

FIG. 4 shows a display apparatus according to various exemplary embodiments. A display apparatus 300 of the various exemplary embodiments includes a display panel 310, a cover glass 320, a backlight unit 330, and a housing 340. In the various exemplary embodiments of the present invention, the cover glass 320 and the display panel 310 have the same width in vertical and horizontal directions, and the peripheral edge portions of the cover glass 320 and the display panel 310 are spaced from an internal surface of a frame portion 342 of the housing 340.

In various exemplary embodiments of the present invention, the display apparatus 300 includes a first adhesive member 351 for bufferably attaching a rear surface of the display panel 310 to a front surface of a stepped portion 343 of the frame portion 342 and maintaining a gap between the rear surface of the display panel 310 and a front surface of the backlight unit 330, and a second adhesive member 352 for bufferably attaching a rear surface of a peripheral rim of the cover glass 320 to a front surface of a peripheral rim of the display panel 310 and maintaining a gap between a rear surface of the cover glass 320 and a front surface of the display panel 310. Other components may be configured in the same manner as in the various exemplary embodiments.

Figure 5:
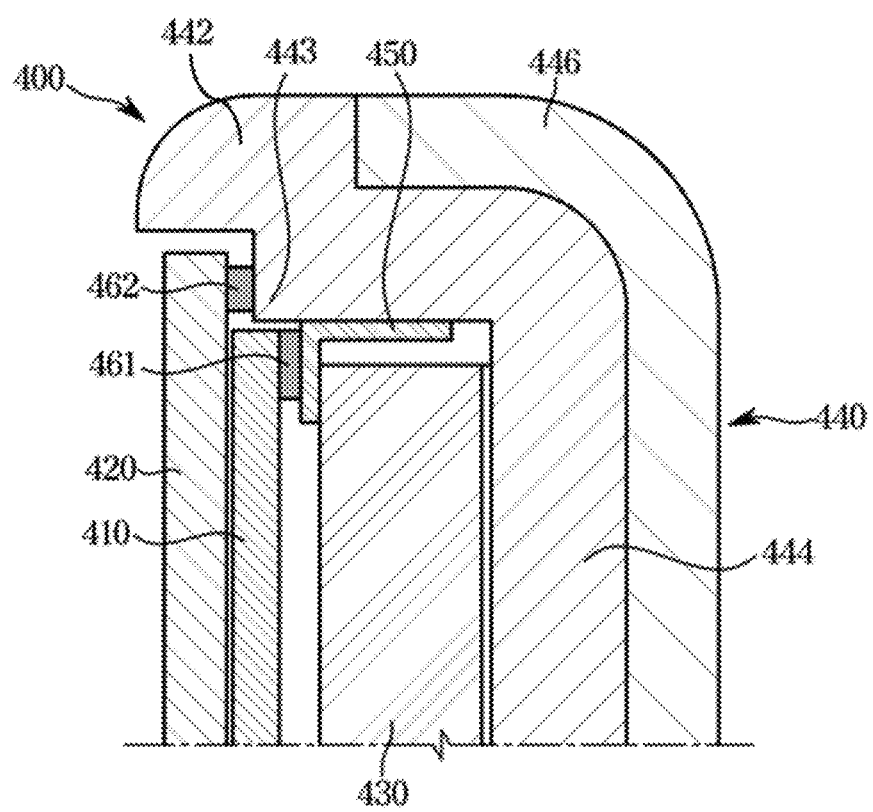
FIG. 5 is a cross-sectional view of a display apparatus of a vehicle, according to various exemplary embodiments of the present invention.

FIG. 5 shows a display apparatus according to various exemplary embodiments. A display apparatus 400 of the various exemplary embodiments includes a cover glass 420 for covering a front surface of a display panel 410 and having a width greater than that of the display panel 410, a backlight unit 430 mounted a rear side of the display panel 410 and having a width smaller than that of the display panel 410, and a housing 440 including a frame portion 442 covering peripheral edge portions of the backlight unit 430, the display panel 410, and the cover glass 420, and a rear surface portion 444 provided integrally with the frame portion 442 and covering a rear surface of the backlight unit 430. The frame portion 442 includes a stepped portion 443 which protrudes step-shaped from an internal surface of the frame portion to support a rear surface of the cover glass 420 and to cover peripheral edge portions of the display panel 410 and the backlight unit 430.

In the various exemplary embodiments of the present invention, the display apparatus 400 includes a panel supporting member 450 mounted on the internal surface of the stepped portion 443 for supporting a rear surface of a peripheral rim of the display panel 410, a first adhesive member 461 for bufferably attaching a rear surface of the peripheral rim of the display panel 410 to a front surface of the panel supporting member 450, and a second adhesive member 462 for bufferably attaching a rear surface of a peripheral rim of the cover glass 420 to a front surface of the stepped portion 443.

In the various exemplary embodiments of the present invention, a front surface of the display panel 410 is spaced from the rear surface of the cover glass 420, and a peripheral edge portion thereof is spaced from the stepped portion 443. A front surface of the backlight unit 430 is spaced from a rear surface of the display panel 410, and a peripheral edge portion thereof is spaced from the stepped portion 443. A peripheral edge portion of the cover glass 420 is spaced from an internal surface of the frame portion 442. A front surface of the frame portion 442 protrudes more forward than a front surface of the cover glass 420 to form a step therebetween. The housing 440 includes a rear cover 446 for covering the rear surface portion 444 and a portion of an external surface of the frame portion 442.

The display apparatuses 200, 300, and 400 according to the second to various exemplary embodiments can maintain sufficient rigidity while reducing the thickness and the bezel size, as in the display apparatus 100 according to the various exemplary embodiments. Furthermore, the internal components may be stably protected when the housing or the backlight unit is expanded or contracted by heat or shock and vibration are applied to the housing.

As is apparent from the above, the display apparatus of a vehicle according to the exemplary embodiments of the present invention is provided such that the frame portion and the rear surface portion of the housing are integrally formed and the display panel, the backlight unit, and the cover glass are accommodated in the housing, maintaining sufficient rigidity while reducing thickness and bezel size.

The display apparatus of a vehicle according to the exemplary embodiments of the present invention is provided such that the rear surface of the display panel is spaced from the front surface of the backlight unit, the peripheral edge portions of the display panel and the cover glass are spaced from the housing, the peripheral edge portion of the backlight unit is spaced from the housing, and the display panel is supported by the bufferable adhesive member, so that the internal components may be stably protected when the housing or the backlight unit is expanded or contracted by heat or shock and vibration are applied to the housing.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A display apparatus for a vehicle, the display apparatus comprising:
   a display panel;
   a cover glass covering a front surface of the display panel and having a width greater than a width of the display panel;
   a backlight unit mounted behind the display panel and having a width smaller than the width of the display panel; and
   a housing including:
      a frame portion covering a peripheral edge portion of the backlight unit, the display panel, and the cover glass, and a rear surface portion integrally provided with the frame portion and covering a rear surface of the backlight unit; and
      a rear cover covering the rear surface portion and including a reversed L-shaped curved portion of an external peripheral surface of the frame portion and disposed in direct contact with the rear surface portion;
   wherein the frame portion includes a stepped portion protruding step-shaped from an internal surface of the frame portion to support a rear surface of the cover glass and to cover a peripheral edge portion of the display panel and the backlight unit,
   wherein the frame portion includes a first curved part and the reversed L-shaped curved portion is fitting to the first curved part,
   wherein a peripheral edge portion of the display panel is spaced from the internal surface of the frame portion,
   wherein a front surface of the backlight unit is spaced from a rear surface of the display panel,
   wherein a peripheral edge portion of the cover glass is spaced from the internal surface of the frame portion,
   wherein a front surface of the frame portion is protrudingly formed more forward than a front surface of the cover glass and spaced from the peripheral edge portion of the cover glass in a width direction of the cover glass to form a step therebetween, wherein the peripheral edge portion of the backlight unit is spaced from the stepped portion, wherein the display apparatus further includes a panel supporting member mounted on an internal surface of the stepped portion for supporting a rear surface of a peripheral rim of the display panel, a first adhesive member bufferably attaching the rear surface of the peripheral rim of the display panel to a front surface of the panel supporting member, and a second adhesive member bufferably attaching a rear surface of a peripheral rim of the cover glass to a front surface of the stepped portion, wherein the panel supporting member includes a first portion disposed on the front surface of the backlight unit and a second portion extending rearward from the first portion and configured to contact the internal surface of the stepped portion, and wherein the second portion is spaced from the peripheral edge portion of the backlight unit with an empty space between the second portion and the peripheral edge portion.

2. The display apparatus according to claim 1, wherein the front surface of the display panel is spaced from the rear surface of the cover glass.

3. The display apparatus according to claim 1, wherein the external peripheral surface of the frame portion includes a rear cover engaging portion having a step corresponding to a thickness of the rear cover.

\* \* \* \* \*